United States Patent
Khandare et al.

(10) Patent No.: US 12,052,573 B2
(45) Date of Patent: Jul. 30, 2024

(54) SYSTEMS AND METHODS FOR MITIGATING FRAUD BASED ON GEOFENCING

(71) Applicant: Verizon Patent and Licensing Inc., Basking Ridge, NJ (US)

(72) Inventors: Harshal Khandare, Watertown, MA (US); Sameh El-Gawady, Waltham, MA (US); Harinarayanan Janardhanan, Woburn, MA (US); Riya Agarwal, West Windsor, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 17/454,530

(22) Filed: Nov. 11, 2021

(65) Prior Publication Data

US 2023/0164570 A1    May 25, 2023

(51) Int. Cl.
*H04W 12/64* (2021.01)
*G06Q 20/40* (2012.01)
*H04L 9/40* (2022.01)
*H04W 12/06* (2021.01)
*H04W 12/30* (2021.01)

(52) U.S. Cl.
CPC .......... *H04W 12/64* (2021.01); *H04L 63/083* (2013.01); *H04L 63/0853* (2013.01); *H04W 12/06* (2013.01); *H04W 12/35* (2021.01); *G06Q 20/4016* (2013.01)

(58) Field of Classification Search
None
See application file for complete search history.

(56) References Cited

U.S. PATENT DOCUMENTS

| | | | |
|---|---|---|---|
| 11,017,100 B2 | 5/2021 | Krishnamoorthy et al. | |
| 11,188,915 B2* | 11/2021 | Phillips | G06Q 20/4016 |
| 11,501,303 B2* | 11/2022 | Johnson | G06Q 20/4016 |
| 11,568,419 B1* | 1/2023 | Van Cleave | G06Q 50/14 |
| 2011/0235810 A1* | 9/2011 | Neusinger | G10L 19/26 381/23 |

(Continued)

OTHER PUBLICATIONS

OpenID Connect: The Internet Identity Layer, Website: https://openid.net/connect/, Obtained Nov. 11, 2021, 4 Pages.

(Continued)

*Primary Examiner* — Younes Naji

(57) ABSTRACT

A device may receive, from a user device associated with a user and located at a location, a request to access a service, and may provide, based on the request, an authorization request to an authentication system. The device may receive an authorization code from the authentication system, and may request an access token from an authorization system. The device may receive the access token, and may request user information from the authorization system. The device may receive the user information, a first confidence score, and a second confidence score, and may perform a geofence analysis of the location to generate a third confidence score. The device may determine whether the request is genuine or fraudulent based on the user information, the first confidence score, the second confidence score, and the third confidence score, and may approve or deny the request based on whether the request is genuine or fraudulent.

20 Claims, 9 Drawing Sheets

(56) References Cited

U.S. PATENT DOCUMENTS

| | | | |
|---|---|---|---|
| 2018/0121669 A1* | 5/2018 | Motwani | H04L 63/0823 |
| 2020/0036515 A1* | 1/2020 | Chari | H04L 9/3239 |
| 2020/0204531 A1* | 6/2020 | Hamm | H04L 63/08 |
| 2021/0044624 A1* | 2/2021 | Hu | H04L 63/1466 |
| 2021/0392161 A1* | 12/2021 | Yarabolu | H04L 63/1458 |
| 2022/0256048 A1* | 8/2022 | Shimakawa | H04N 1/00824 |

OTHER PUBLICATIONS

Sakimura et al., "OpenID Connect Basic Client Implementer's Guide 1.0—draft 40," Website: https://openid.net/specs/openid-connect-basic-1_0.html#Scopes, Obtained Nov. 11, 2021, 31 Pages.

* cited by examiner

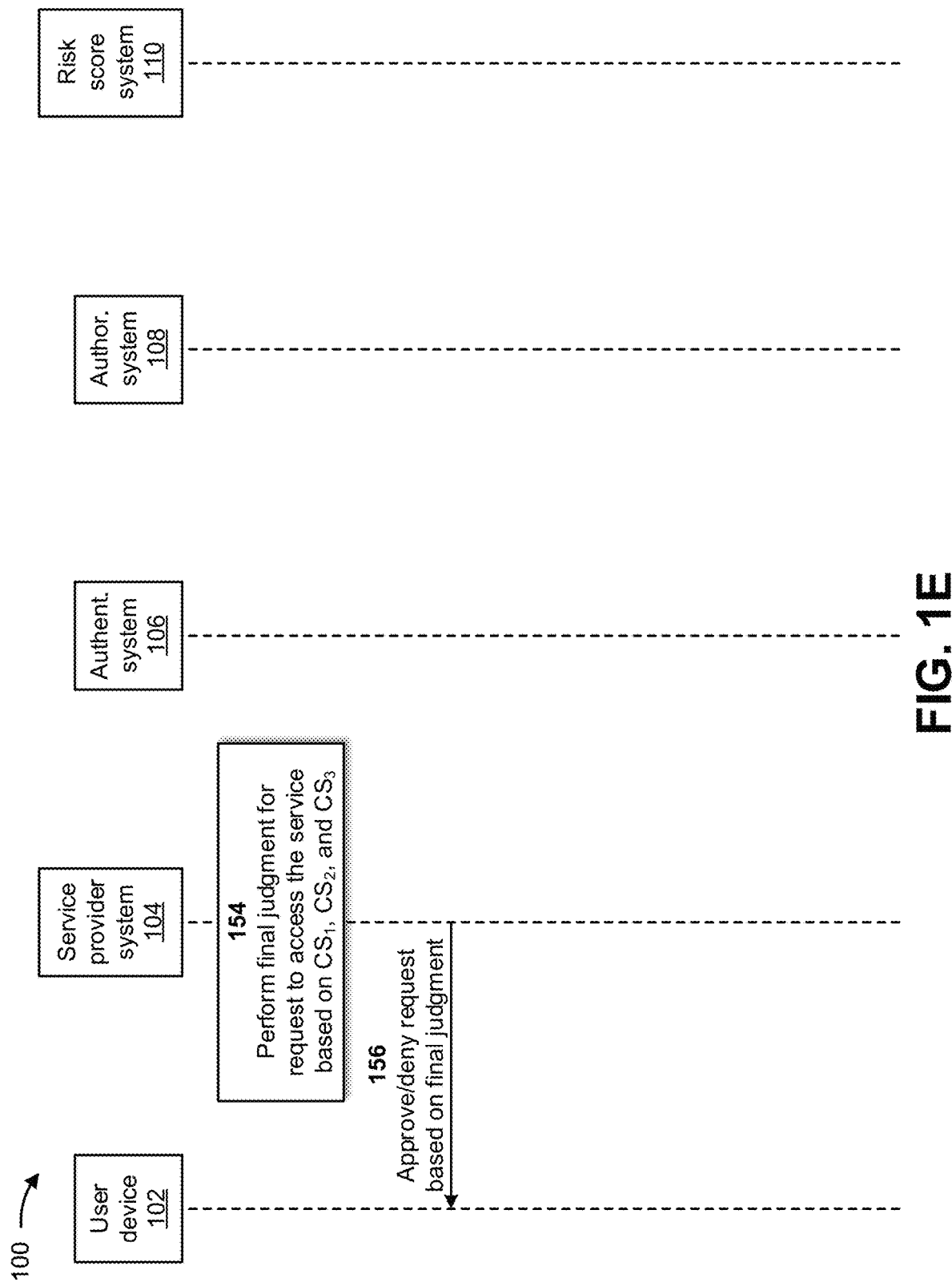

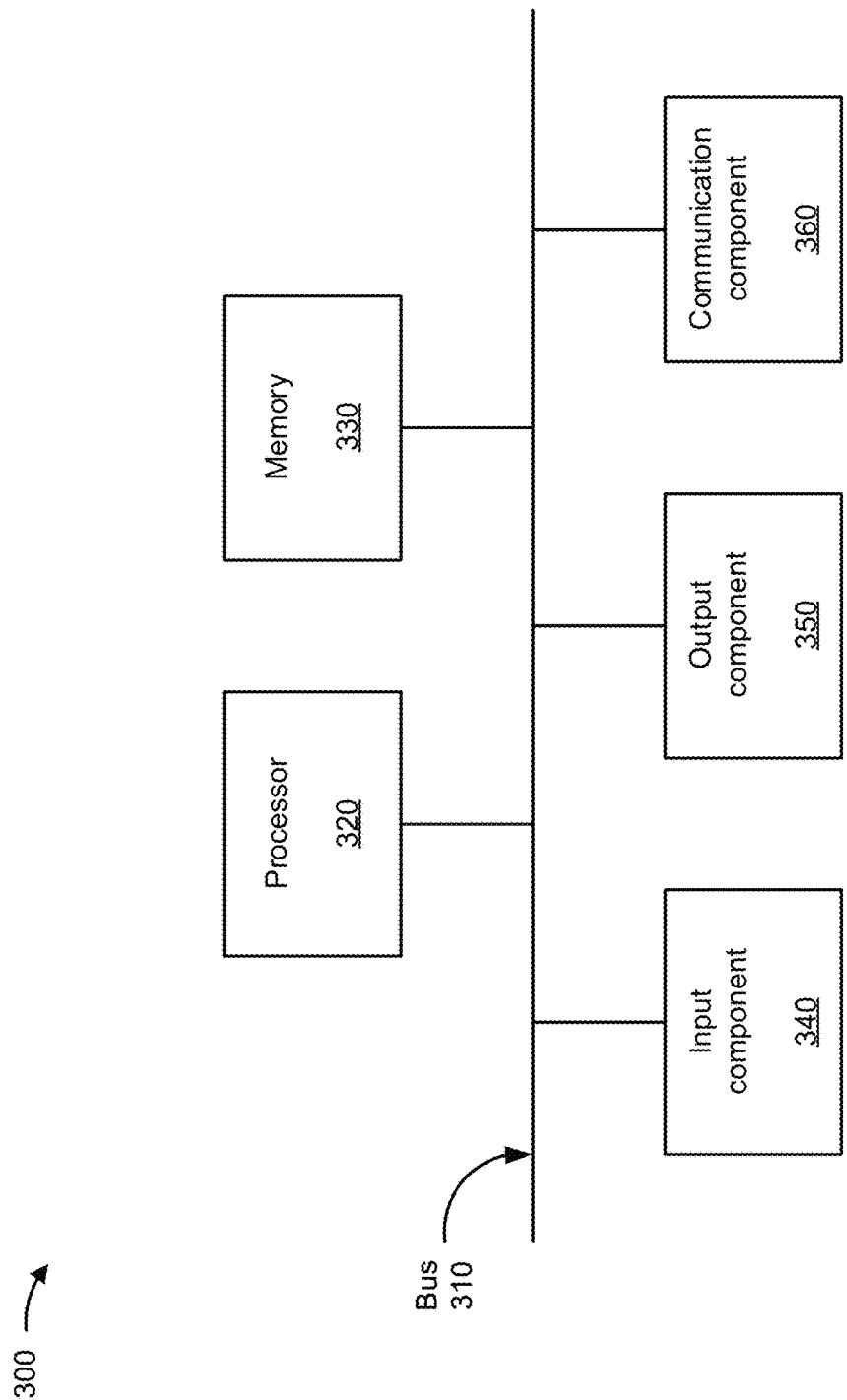

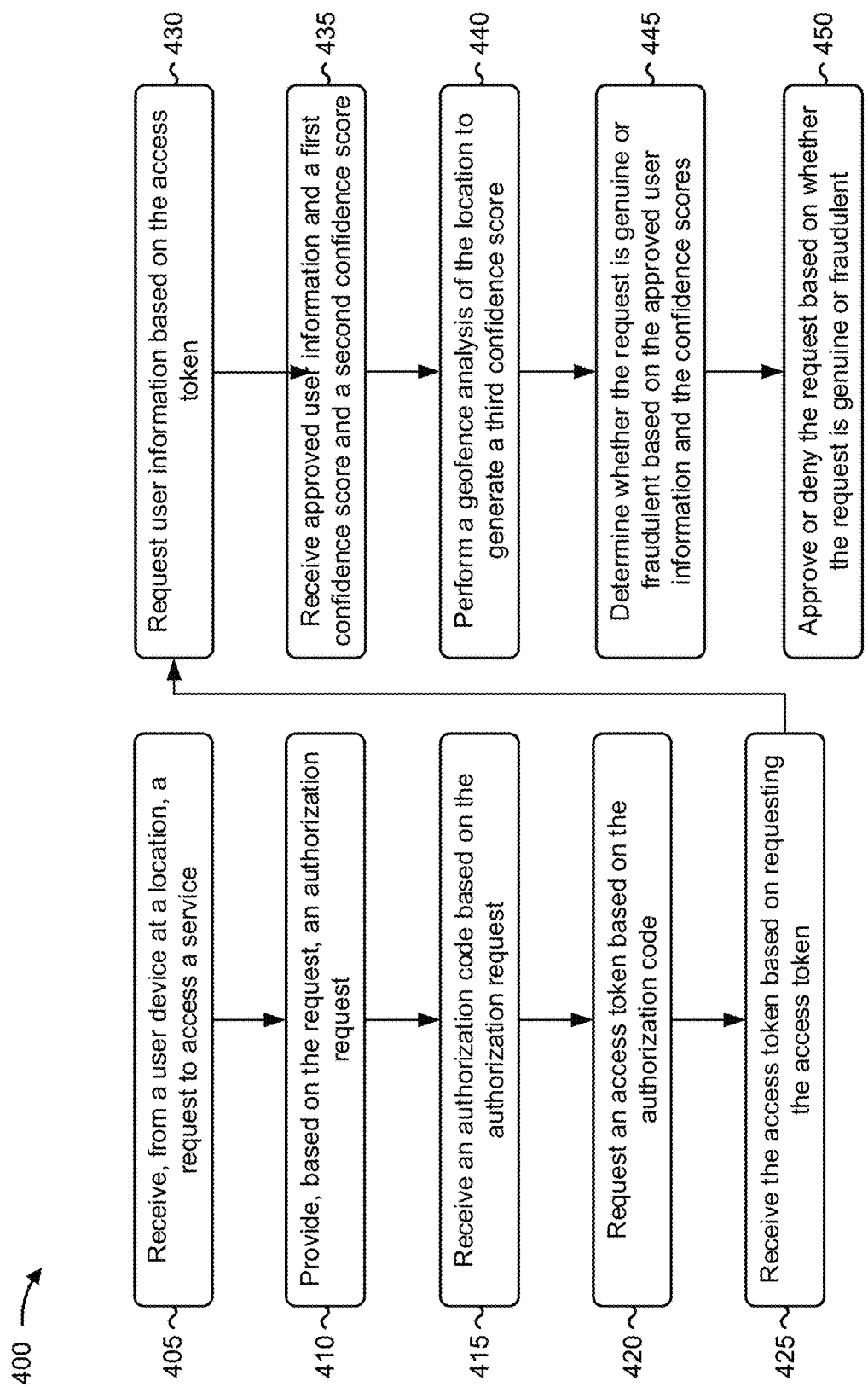

SYSTEMS AND METHODS FOR MITIGATING FRAUD BASED ON GEOFENCING

BACKGROUND

Mobile geofencing is a location-based service that utilizes global positioning system (GPS), Wi-Fi, Bluetooth, and a mobile network associated with a user device (e.g., a mobile device) to precisely identify a geographic location of a user in possession of the user device. Mobile applications may utilize mobile geofencing to offer location-based services to users.

BRIEF DESCRIPTION OF THE DRAWINGS

FIGS. 1A-1F are diagrams of an example associated with mitigating fraud based on geofencing.

FIG. 3 is a diagram of example components of one or more devices of FIG. 2.

FIG. 4 is a flowchart of an example process for mitigating fraud based on geofencing.

DETAILED DESCRIPTION OF PREFERRED EMBODIMENTS

Figure 1A:
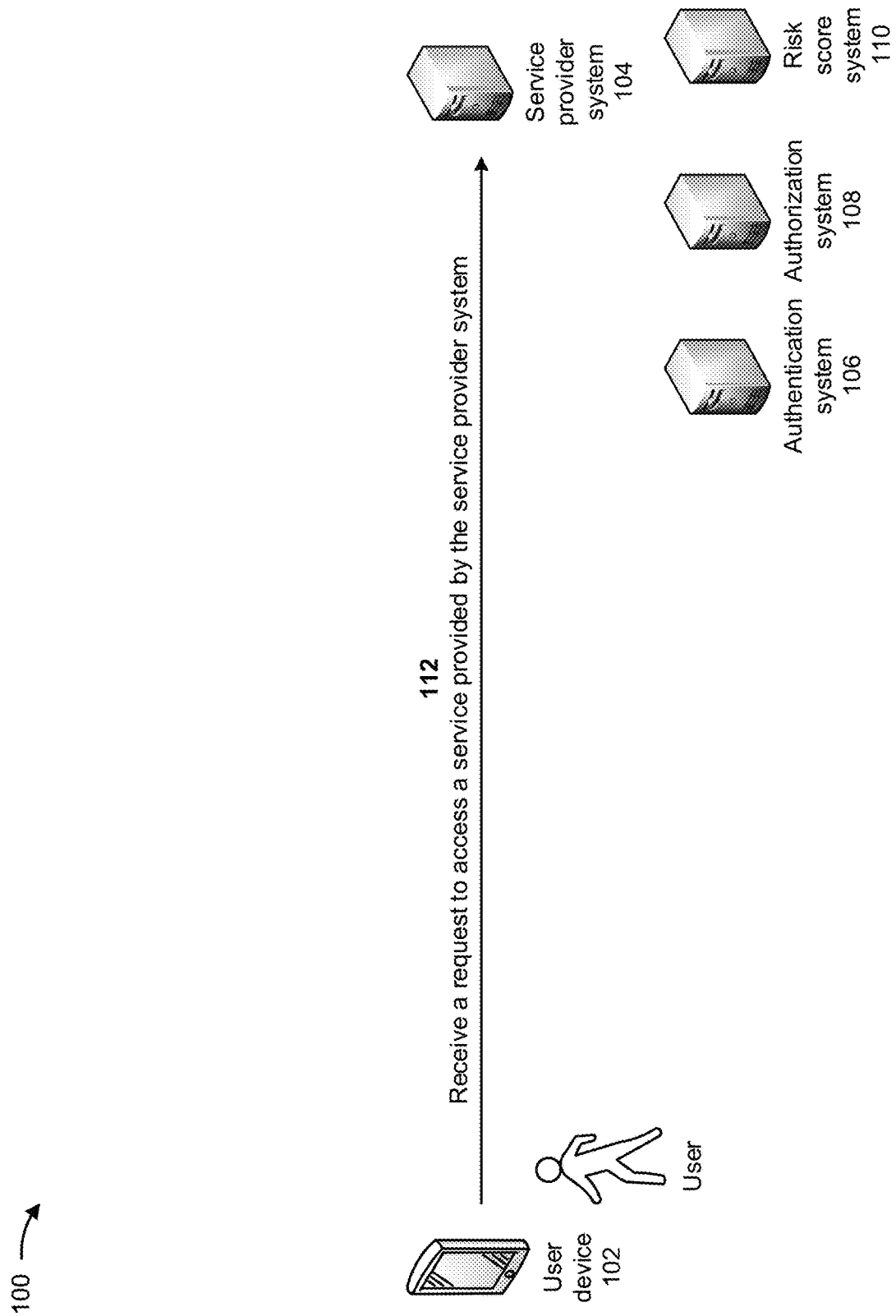

The following detailed description of example implementations refers to the accompanying drawings. The same reference numbers in different drawings may identify the same or similar elements.

Some authentication systems ensure authenticities of transactions based on user device identification, user biometrics, certificate pinning, on-device secure storage and encryption, session-based tokens, usage of secure protocols, and/or the like. In ensuring authenticities of transactions, the authentication systems may enable users to securely sign-in to services provided by service providers based on successful authentication of the users via a two-step consent flow process. However, such authentication systems may serve as a potential target to a malicious user who might attempt to impersonate a real user by initiating and approving a consent flow process on the user's behalf. Thus, current authentication systems consume computing resources (e.g., processing resources, memory resources, communication resources, and/or the like), networking resources, and/or other resources associated with exposing sensitive user data to security risks, handling security breaches associated with sensitive user data, recovering sensitive user data lost in security breaches, and/or the like.

Some implementations described herein provide a service provider system that mitigates fraud based on geofencing. For example, the service provider system may receive, from a user device associated with a user and located at a location, a request to access a service provided by the device, and may provide, based on the request, an authorization request to an authentication system. The service provider device may receive, based on the authorization request, an authorization code from the authentication system, and may request, from an authorization system, an access token based on the authorization code. The service provider device may receive, from the authorization system, the access token based on requesting the access token, and may request, from the authorization system, user information based on the access token. The service provider device may receive, from the authorization system and based on requesting the user information, approved user information, a first confidence score (e.g., calculated based on a first geofence analysis of the location), and a second confidence score (e.g., calculated based on a second geofence analysis of the location), and may perform a geofence analysis of the location to generate a third confidence score. The service provider device may determine whether the request is genuine or fraudulent based on the approved user information, the first confidence score, the second confidence score, and the third confidence score, and may approve or deny the request based on whether the request is genuine or fraudulent.

In this way, the service provider system mitigates fraud based on geofencing. For example, the service provider system may incorporate mobile geofencing to further proof the service provider system against fraud (e.g., security breaches, fraudulent transactions, and/or the like) and provide an additional layer of security. The service provider system may identify fraud (e.g., malicious user access of a service provided by the service provider system) by determining a risk associated with a transaction (e.g., a request to access the service) based on user and user device attributes. The service provider system may determine whether to allow or reject the transaction based on the risk. The service provider system may utilize geofencing to complement the risk assessment based on a dynamic attribute (e.g., a physical location of the user) in real-time, and to validate an authenticity of the transaction. Thus, the service provider system may conserve computing resources, networking resources, and/or other resources that would otherwise have otherwise been consumed by exposing sensitive user data to security risks, handling security breaches associated with sensitive user data, recovering sensitive user data lost in security breaches, and/or the like.

FIGS. 1A-1F are diagrams of an example 100 associated with mitigating fraud based on geofencing. As shown in FIGS. 1A-1F, example 100 includes a user device 102 (e.g., associated with a user), a service provider system 104, an authentication system 106, an authorization system 108, and a risk score system 110. The user device 102 may include a wireless communication device, a mobile phone, a user equipment, a laptop computer, a tablet computer, and/or the like. The service provider system 104 may include a system that provides a service (e.g., a financial application, a network service, and/or the like) to the user device 102. The authentication system 106 may include a system that provides a network-based authentication and identity service based on a secure protocol (e.g., an OpenID Connect (OIDC) protocol). The authorization system 108 may include a system that authorizes requests from the authentication system 106. The risk score system 110 may include a system that identifies fraud associated with a transaction by determining a risk (e.g., a risk score) associated with the transaction based on attributes associated with the user and the user device 102. Further details of the user device 102, the service provider system 104, the authentication system 106, the authorization system 108, and the risk score system 110 are provided elsewhere herein.

As shown in FIG. 1A, and by reference number 112, the service provider system 104 may receive, from the user device 102 (e.g., located at a geographical location, hereinafter referred to as location), a request to access a service provided by the service provider system 104. For example, the user in possession of the user device 102 may attempt to access (e.g., log into) an application (e.g., a mobile application, such as a mobile banking application) provided by the service provider system 104 (e.g., a financial institution)

using an authentication service (e.g., another mobile application) provided by the authentication system 106. In such an example, the user may utilize the user device 102 to select a "sign in with the authentication service" selection mechanism (e.g., a button, a link, a menu item, and/or the like) on a login page of the application provided by the service provider system 104. When the user attempts to access the application provided by the service provider system 104, the user device 102 may generate the request to access the service provided by the service provider system 104 and may provide the request to the service provider system 104. The service provider system 104 may receive the request from the user device 102.

Figure 1B:
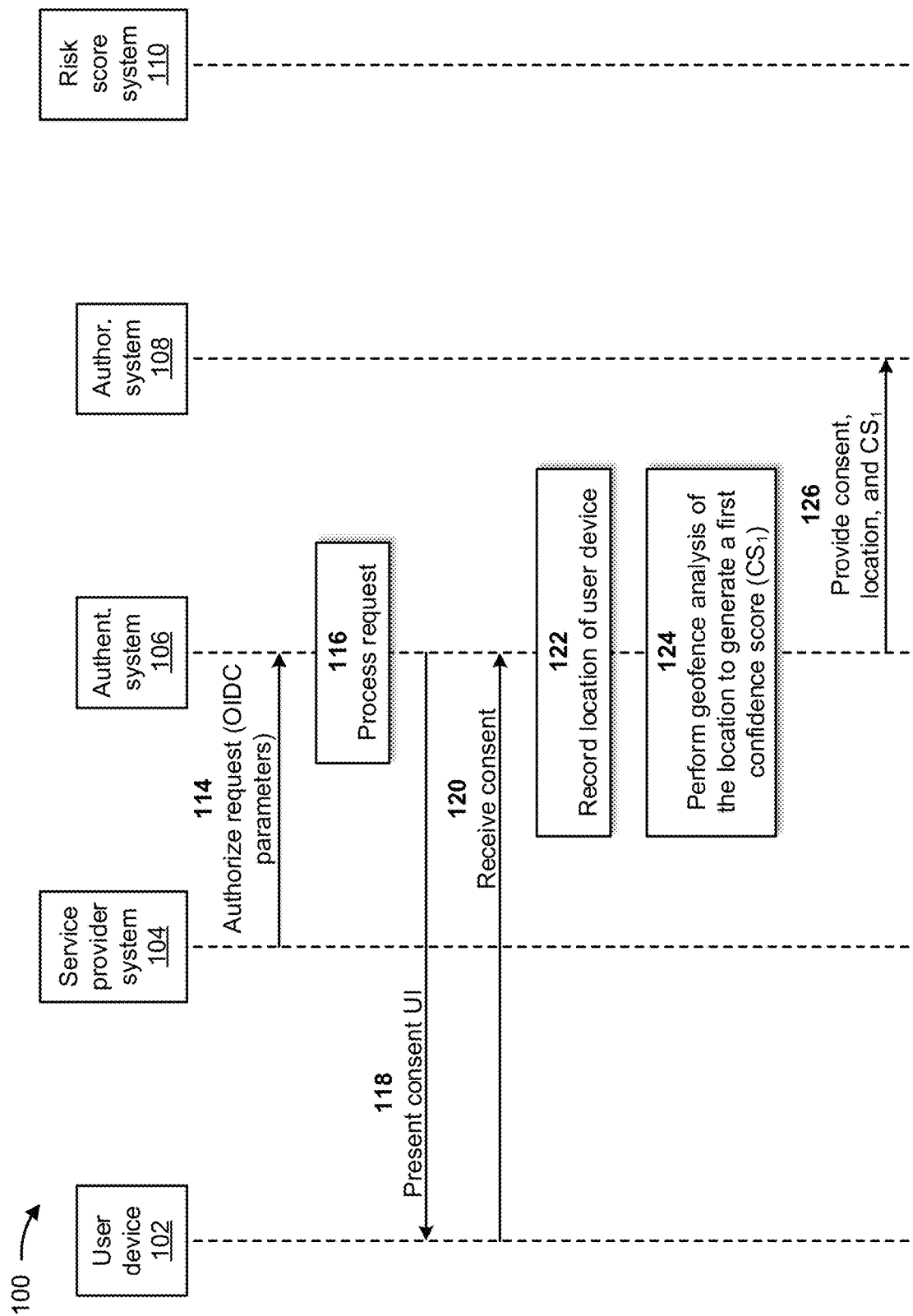

As shown in FIG. 1B, and by reference number 114, the service provider system 104 may provide, to the authentication system 106, an authorization request to authorize the request to access the service provided by the service provider system 104. For example, the service provider system 104 may generate an authorization request that includes OIDC attributes. The OIDC attributes may include user information (e.g., a name of the user, an email address of the user, a telephone number of the user or the user device 102, and/or the like), a geographical location of the user device 102 when the request to access the service is received, and/or other information required for the user to complete the sign in process. Once the authorization request is generated, the service provider system 104 may provide the authorization request to the authentication system 106, and the authentication system 106 may receive the authentication request.

As further shown in FIG. 1B, and by reference number 116, the authentication system 106 may process the authorization request. For example, the authentication system 106 may process the authorization request by identifying actions to be performed based on the OIDC attributes of the authorization request, and performing the actions. The actions may include the authentication system 106 requesting the user to provide biometrics, requesting that the user provide an answer to a challenge question, and/or the like.

As further shown in FIG. 1B, and by reference number 118, the authentication system 106 may provide a consent user interface (UI), for presentation, to the user device 102. For example, the authentication system 106 may perform an authorization of the authorization request via a consent flow where the user is first presented with a consent user interface that includes information associated with the request to access the service of the service provider system 104. The user may also be presented a user interface that includes user information that the service provider system 104 is requesting from the user to complete the access to the service. The user may review the information presented by the user interfaces, and may select the user information to be shared with the service provider system 104.

As further shown in FIG. 1B, and by reference number 120, the authentication system 106 may receive consent from the user device 102. For example, the user may utilize the user device 102 to provide explicit consent to sharing the user information (e.g., selected by the user) in order for the service provider system 104 to verify the user and complete the access to the service. The user device 102 may provide the consent to share the selected user information to the authentication system 106, and the authentication system 106 may receive the consent to share the selected user information. In some implementations, the authentication system 106 may ensure the authenticity of the request to access the service based on identification of the user device 102, biometrics, certificate pinning, and/or the like.

As further shown in FIG. 1B, and by reference number 122, the authentication system 106 may record the location of the user device 102. For example, the authentication system 106 may capture and record the location of the user device 102 based on the consent received from the user device 102. In some implementations, the authentication system 106 may request and receive the location of the user device 102 from a network to which the user device 102 is connected, may receive the location directly from the user device 102, or may receive the location of the user device 102 from the network and from the user device 102.

As further shown in FIG. 1B, and by reference number 124, the authentication system 106 may perform a geofence analysis of the location to generate a first confidence score (CS1) indicating a confidence in the validity of the request to access the service of the service provider system 104. For example, the authentication system 106 may utilize the location of the user device 102 to implement a real-time intelligent assessment of the request to access the service. The authentication system 106 may securely track historical locations associated with historical transactions conducted by the user via the authentication system 106. Over time, the historical location information (e.g., geofencing information) may enable the authentication system 106 to perform analytics that assist in computing a confidence level for a particular transaction's location based on an acceptable location variability index defined for the user device 102. The variability index may be based on factors, such as a plausible difference between a current location of the user device 102 and historical locations of the user device 102. For example, the authentication system 106 may determine whether the current location of the user device 102 is located within a subset of past locations of the user device 102. If the current location is not located within the subset of past locations, the authentication system 106 may determine whether the difference between the current location and past locations is marginal or significant, whether the difference between the current location and past locations may be traveled by the user in a time period since a previous transaction of the user device 102.

In some implementations, the authentication system 106 may perform a geofence analysis, based on the current location of the user device 102 and the historical locations associated with respective historical transactions conducted by the user device 102, to generate the first confidence score (CS1). Further details of the geofence analysis, performed by the authentication system 106, are provided below in connection with FIG. 1F. In some implementations, the authentication system 106 may utilize a machine learning model to adjust and/or apply weights to the historical locations when performing the geofence analysis.

As further shown in FIG. 1B, and by reference number 126, the authentication system 106 may provide, to the authorization system 108, the user information consented to by the user, the location of the user device 102, and the first confidence score (CS1). For example, the authentication system 106 may generate an authorization request (e.g., a hypertext transfer protocol secure (HTTPS) authorization request that includes the user information consented to by the user, the location of the user device 102, and the first confidence score (CS1). The authorization request may also include user attributes, user device attributes of the user device 102, and network attributes. The user attributes may include data identifying the user, an account of the user, an account profile or a settings profile of the account of the user, account information associated with the user (e.g., a name, an address, a telephone number, an email address, a billing address, a service address, an account age, privacy settings, payment information, of the user's account), biometric information associated with the user, and/or the like. The user device attributes may include data associated with the user device 102, such as, for example, device profile data, a mobile directory number (MDN), an international mobile subscriber identity (IMSI), a subscriber identity module (SIM) ID, an international mobile equipment identifier (IMEI), a mobile equipment identifier (MEID), device operational characteristics, device activity, device location, and/or the like. The network attributes may include, for example, a network address (e.g., an Internet protocol (IP) address, a port address, a medium access control (MAC) address, and/or the like) of the user device 102. The authentication system 106 may provide the authorization request to the authorization system 108, and the authorization system 108 may receive the authorization request and the information contained therein.

Figure 1C:
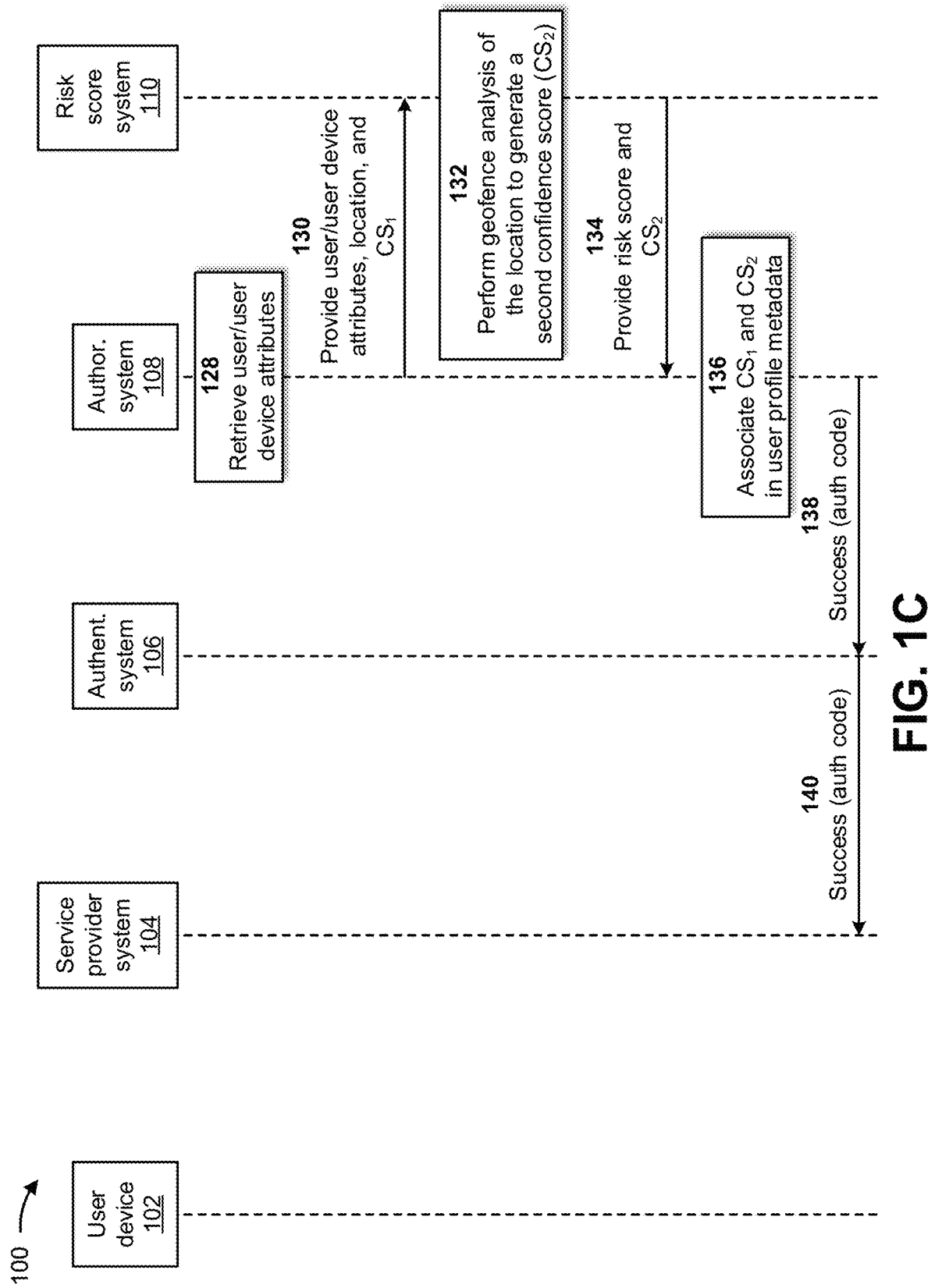

As shown in FIG. 1C, and by reference number 128, the authorization system 108 may retrieve the user attributes, the user device attributes of the user device 102, and the network attributes from the authorization request. For example, the authorization system 108 may analyze the authorization request to identify the user attributes, the user device attributes, and the network attributes in the authorization request, and may retrieve the user attributes, the user device attributes, and the network attributes from the authorization request based on the analysis.

As further shown in FIG. 1C, and by reference number 130, the authorization system 108 may provide the user attributes, the user device attributes, the network attributes, the location of the user device 102, and the first confidence score (CS1) to the risk score system 110. For example, the authorization system 108 may securely (e.g., via encryption, encoding, and/or the like) provide the user attributes, the user device attributes, the network attributes, the location, and the first confidence score (CS1) to the risk score system 110, and the risk score system 110 may receive the user attributes, the user device attributes, the network attributes, the location, and the first confidence score (CS1).

In some implementations, the risk score system 110 may determine whether fraud is associated with a transaction (e.g., the request to access the service) by determining a risk (e.g., a risk score) associated with the transaction based on the user attributes, the user device attributes, the network attributes, the location, and the first confidence score (CS1). The risk score may represent a score that identifies whether or not the user is likely to be the user, person, or entity that the user is claiming to be when attempting to access the service provided by the service provider system 104. In some implementations, the risk score system 110 may calculate a weighted sum, based on the user attributes, the user device attributes, the network attributes, the location, and the first confidence score (CS1), to determine a risk score associated with the user. In some implementations, the risk score system 110 may utilize a machine learning model (e.g., a Bayesian model) that determines the risk score for the user based on the user attributes, the user device attributes, the network attributes, the location, and the first confidence score (CS1).

As further shown in FIG. 1C, and by reference number 132, the risk score system 110 may perform a geofence analysis of the location, based on the user attributes, the user device attributes, the network attributes, the location of the user device 102, and the first confidence score (CS1), to generate a second confidence score (CS2) indicating a confidence in the validity of the request to access the service of the service provider system 104. For example, the risk score system 110 may utilize the location of the user device 102 to implement a real-time intelligent assessment of the request to access the service. The risk score system 110 may utilize the geofence analysis to complement the risk score calculated by the risk score system 110. The geofence analysis may utilize a dynamic attribute (e.g., the physical location of the user device 102) in real-time to validate the authenticity of the request to the access the service. In some implementations, the risk score system 110 may maintain historical transactions conducted by the user device 102 and corresponding historical locations of the historical transactions.

In some implementations, the risk score system 110 may perform the geofence analysis, based on the current location of the user device 102, the historical locations associated with respective historical transactions conducted by the user device 102, the user attributes, the user device attributes, the network attributes, and the first confidence score (CS1), to generate the second confidence score (CS2). Further details of the geofence analysis, performed by the risk score system 110, are provided below in connection with FIG. 1F. In some implementations, the risk score system 110 may utilize a machine learning model to adjust and/or apply weights to the historical locations, the user attributes, the user device attributes, and the network attributes, when performing the geofence analysis. In some implementations, when performing the geofence analysis, the risk score system 110 may analyze other features associated with a transaction (e.g., as described above in connection with the authentication system 106), such as a type of transaction, past locations of transactions of a same type, dollar values of transactions, locations of transactions based on time, quantities of items purchased in transactions, spending patterns of the user, and/or the like.

In some implementations, the risk score system 110 may analyze other features associated with transactions conducted by the user device 102, such as a type of transaction, when performing the geofence analysis. For example, if a transaction is a mobile payment for groceries, the user may purchase groceries from particular locations in the past. Thus, the risk score system 110 may analyze past locations of transactions of a same type when performing the geofence analysis. The risk score system 110 may analyze dollar values of transactions when performing the geofence analysis. If a dollar value of a transaction is above a certain amount, the risk score system 110 may determine a higher confidence score than for transactions with dollar values below that certain amount. The risk score system 110 may analyze locations of transactions based on time. For example, if the user just performed a transaction in Centreville, Virginia and the historical information shows that the user performed a transaction an hour ago one-hundred miles away from Centreville (e.g., in Baltimore, Maryland), then the risk score system 110 may identify an issue with the current transaction (e.g., generate a low confidence score). In some implementations, the risk score system 110 may analyze quantities of items purchased in transactions when performing the geofence analysis. For example, if the user historically purchases twenty gallons of gasoline once a week and current transactions indicate that the user purchased one-hundred gallons of gasoline for three days in a row, the risk score system 110 may identify an issue with the current transactions (e.g., generate a low confidence score). In some implementations, the authentication system 106 may analyze spending patterns of the user when performing the geofence analysis. For example, if the user historically purchases between $250 and $300 worth of groceries each week and a current transaction indicates that the user purchased $1,000 worth of groceries, the authentication system 106 may identify an issue with the current transaction (e.g., generate a low confidence score).

As further shown in FIG. 1C, and by reference number 134, the risk score system 110 may provide the risk score and the second confidence score (CS2) to the authorization system 108. For example, the risk score system 110 may provide, to the authorization system 108, the risk score calculated by the risk score system 110 for the request to access the service, the second confidence score (CS2), and other historical confidence scores previously calculated by the risk score system 110 for the user device 102 and/or the user. The authorization system 108 may receive the risk score, the second confidence score (CS2), and the other historical confidence scores.

As further shown in FIG. 1C, and by reference number 136, the authorization system 108 may associate the first confidence score (CS1) and the second confidence score (CS2) for the request to access the service with user profile metadata of a profile of the user. For example, the authorization system 108 may retrieve the first confidence score (CS1) and the user profile metadata from storage and may receive the second confidence score (CS2) from the risk score system 110. The authorization system 108 may associate the first confidence score (CS1) and the second confidence score (CS2) with the user profile metadata by storing the first confidence score (CS1) and the second confidence score (CS2) in the user profile metadata.

As further shown in FIG. 1C, and by reference number 138, the authorization system 108 may provide a successful authorization message (e.g., with an authorization code) to the authentication system 106. For example, the authorization system 108 may generate an authorization code that indicates a successful authorization (e.g., as defined in the OIDC protocol) and may provide the authorization code in the successful authorization message. The authorization system 108 may provide the successful authorization message to the authentication system 106, and the authentication system 106 may receive the successful authorization message. In some implementations, the authorization system 108 may approve the transaction (e.g., the request to the access the service) and generate the successful authorization message based on generation of a high first confidence score (CS1) for the transaction, generation of a high second confidence score (CS2) for the transaction, failure to identify fraud associated with the transaction, generation of a low risk score for the transaction, and/or the like In some implementations, if the authentication system 106 and/or the risk score system 110 reject the transaction (e.g., the request to the access the service) based on generation of a low first confidence score (CS1) for the transaction, generation of a low second confidence score (CS2) for the transaction, identification of fraud associated with the transaction, generation of a high risk score for the transaction, and/or the like, the authorization system 108 may not authorize the transaction. In such implementations, the authorization system 108 may not generate the authorization code or the successful authorization message. Rather, the authorization system 108 may return, to the authentication system 106, an unsuccessful authorization message indicating that the transaction is rejected and reasons for the rejection. The authentication system 106 may provide the unsuccessful authorization message to the service provider system 104 and the service provider system 104 may deny the transaction. In some implementations, if the authentication system 106 initially rejects the transaction, the authorization system 108 and the risk score system 110 may not be involved in the process. In such implementations, the authentication system 106 may provide, to the service provider system 104, a rejection message indicating that the transaction is rejected and reasons for the rejection, and the service provider system 104 may deny the transaction.

As further shown in FIG. 1C, and by reference number 140, the authentication system 106 may provide the successful authorization message (e.g., with the authorization code) to the service provider system 104, when the transaction is approved. For example, the authentication system 106 may forward the successful authorization message to the service provider system 104, and the service provider system 104 may receive the successful authorization message.

Figure 1D:
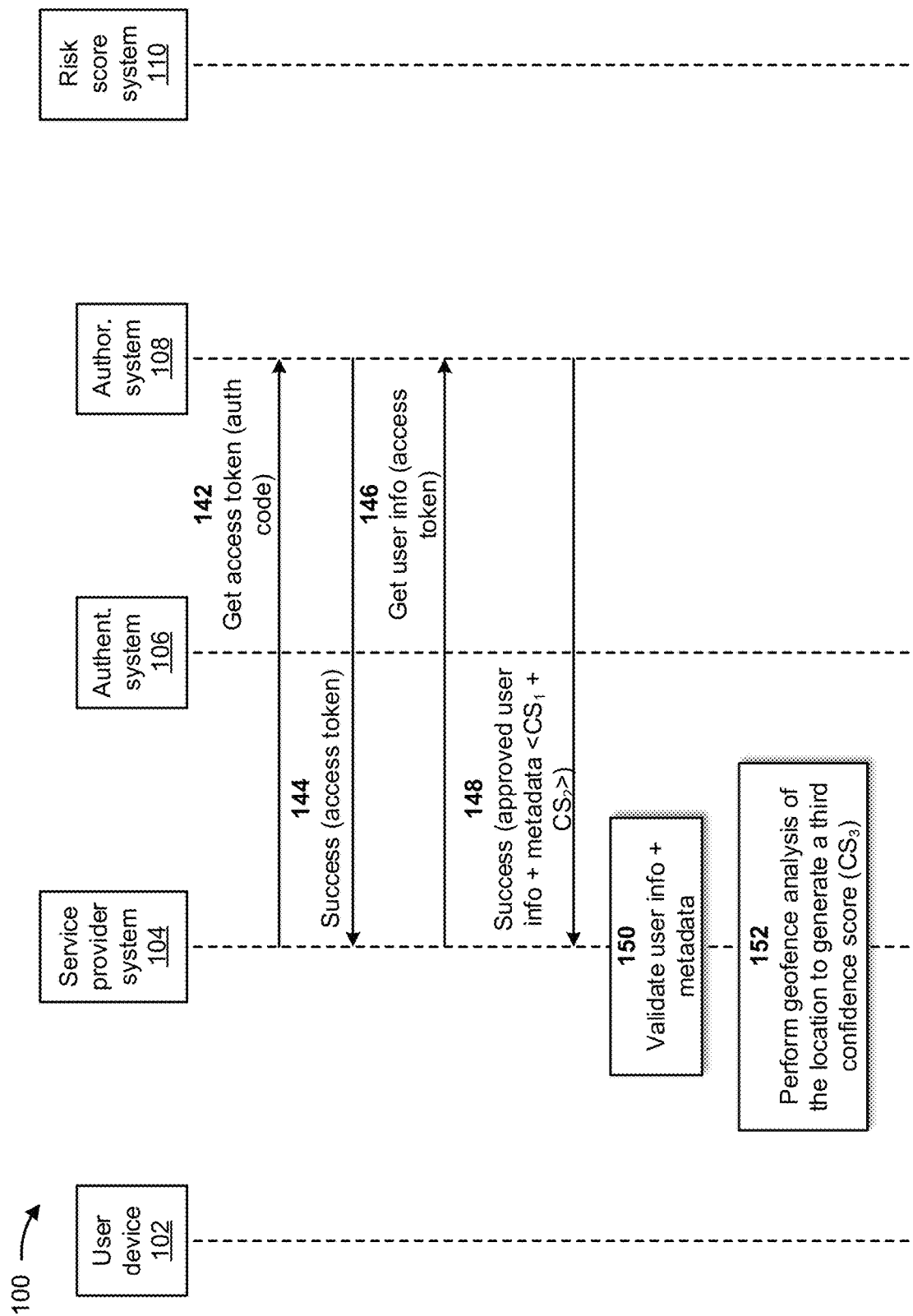

As shown in FIG. 1D, and by reference number 142, the service provider system 104 may provide an access token request to the authorization system 108. For example, based on receiving the successful authorization message, the service provider system 104 may generate an access token request (e.g., as defined in the OIDC protocol) that includes the authorization code and that requests an access token. The service provider system 104 may provide the access token request to the authorization system 108, and the authorization system 108 may receive the access token request.

As further shown in FIG. 1D, and by reference number 144, the authorization system 108 may provide the access token to service provider system 104. For example, the authorization system 108 may validate the authorization code provided in the access token request and may generate a successful authorization message that includes the access token based on validating the authorization code. The authorization system 108 may provide the successful authorization message to the service provider system 104, and the service provider system 104 may receive the successful authorization message. Alternatively, the authorization system 108 may not validate the authorization code provided in the access token request and may generate an unsuccessful authorization message based on not validating the authorization code. The authorization system 108 may provide the unsuccessful authorization message to the service provider system 104, and the service provider system 104 may receive the unsuccessful authorization message. The service provider system 104 may deny the transaction based on the unsuccessful authorization message.

As further shown in FIG. 1D, and by reference number 146, the service provider system 104 may provide a user information request to the authorization system 108. For example, based on receiving the successful authorization message, the service provider system 104 may generate a user information request (e.g., as defined in the OIDC protocol) that includes the access token and that requests the user information. The service provider system 104 may provide the user information request to the authorization system 108, and the authorization system 108 may receive the user information request.

As further shown in FIG. 1D, and by reference number 148, the authorization system 108 may provide the user information and the user profile metadata (e.g., that includes the first confidence score (CS1) and the second confidence score (CS2)) to service provider system 104. For example, the authorization system 108 may validate the access token provided in the user information request and may generate a successful authorization message that includes the user information and the user profile metadata, based on validating the access token. The authorization system 108 may provide the successful authorization message to the service provider system 104, and the service provider system 104 may receive the successful authorization message. Alternatively, the authorization system 108 may not validate the access token provided in the user information request and may generate an unsuccessful authorization message based on not validating the access token. The authorization system 108 may provide the unsuccessful authorization message to the service provider system 104, and the service provider system 104 may receive the unsuccessful authorization message. The service provider system 104 may deny the transaction based on the unsuccessful authorization message.

As further shown in FIG. 1D, and by reference number 150, the service provider system 104 may validate the user information and the user profile metadata. For example, the service provider system 104 may retrieve the user information and the user profile metadata from the successful authorization message, and may validate the user information and the user profile metadata so that the user may utilize the service provided by the service provider system 104 if the user is ultimately granted access to the service. Alternatively, the service provider system 104 may not validate the user information and the user profile metadata and may deny the transaction based on not validating the user information and the user profile metadata.

As further shown in FIG. 1D, and by reference number 152, the service provider system 104 may perform a geofence analysis, based on the location, the user information, the first confidence score (CS1), and the second confidence score (CS2), to generate a third confidence score (CS3) indicating a confidence in the validity of the request to access the service of the service provider system 104. For example, the service provider system 104 may utilize the location of the user device 102 to implement a real-time intelligent assessment of the request to the access the service. The service provider system 104 may utilize the geofence analysis to complement a risk score calculated by the service provider system 104 (e.g., in a manner similar to the manner described above in connection with the risk score system 110). The geofence analysis may utilize a dynamic attribute (e.g., the physical location of the user device 102) in real-time to validate the authenticity of the request to the access the service.

In some implementations, the service provider system 104 may perform the geofence analysis, based on the current location of the user device 102, the user information (e.g., the user attributes, the user device attributes, and the network attributes), the first confidence score (CS1), and the second confidence score (CS2), to generate the third confidence score (CS3). Further details of the geofence analysis, performed by the service provider system 104, are provided below in connection with FIG. 1F. In some implementations, the service provider system 104 may utilize a machine learning model to adjust and/or apply weights to the user attributes, the user device attributes, and the network attributes, when performing the geofence analysis. In some implementations, when performing the geofence analysis, the service provider system 104 may analyze other features associated with a transaction (e.g., as described above in connection with the authentication system 106), such as a type of transaction, past locations of transactions of a same type, dollar values of transactions, locations of transactions based on time, quantities of items purchased in transactions, spending patterns of the user, and/or the like.

As shown in FIG. 1E, and by reference number 154, the service provider system 104 may perform a final judgment for the request to access the service based on the first confidence score (CS1), the second confidence score (CS2), and the third confidence score (CS3). For example, the service provider system 104 may determine whether the request to access the service is genuine or fraudulent based on the user information, the first confidence score (CS1), the second confidence score (CS2), the third confidence score (CS3), and/or any risk scores calculated by the service provider system 104 and/or the risk score system 110.

In some implementations, when determining whether the request to access the service is genuine or fraudulent, the service provider system 104 may assign weights to the first confidence score, the second confidence score, and the third confidence score to generate a first weighted confidence score, a second weighted confidence score, and a third weighted confidence score, respectively. The service provider system 104 may use the first weighted confidence score, the second weighted confidence score, and the third weighted confidence score to generate a final confidence score, and may determine whether the request to access the service is genuine or fraudulent based on the user information and the final confidence score. In some implementations, the service provider system 104 may utilize a machine learning model to adjust the weights assigned to the first confidence score, the second confidence score, and the third confidence score. In some implementations, the service provider system 104 may compare the final confidence score to a threshold confidence score when determining whether the request to access the service is genuine or fraudulent. If the final confidence score satisfies the threshold confidence score, the service provider system 104 may determine that the request to access the service is genuine. If the final confidence score fails to satisfy the threshold confidence score, the service provider system 104 may determine that the request to access the service is fraudulent.

In some implementations, when determining whether the request to access the service is genuine or fraudulent, the service provider system 104 may use the first confidence score, the second confidence score, and the third confidence score to generate a final confidence score, and determine whether the request to access the service is genuine or fraudulent based on the user information and the final confidence score. In some implementations, the service provider system 104 may compare the final confidence score to a threshold confidence score when determining whether the request to access the service is genuine or fraudulent. If the final confidence score satisfies the threshold confidence score, the service provider system 104 may determine that the request to access the service is genuine. If the final confidence score fails to satisfy the threshold confidence score, the service provider system 104 may determine that the request to access the service is fraudulent.

As further shown in FIG. 1E, and by reference number 156, the service provider system 104 may approve or deny the request to access the service based on the final judgment. For example, the service provider system 104 may approve or deny the request to access the service based on whether the request is genuine or fraudulent. In some implementations, when approving or denying the request to access the service, the service provider system 104 may approve the request when the request is determined to be genuine based on the first confidence score (CS1), the second confidence score (CS2), and the third confidence score (CS3). The service provider system 104 may deny the request when the request is determined to be fraudulent based on the first confidence score (CS1), the second confidence score (CS2), and the third confidence score (CS3). In some implementations, the service provider system 104 may provide, to the user device 102, an indication of whether the request to access the service is approved or denied based on whether the request is genuine or fraudulent.

In some implementations, results of the geofence analyses performed by the service provider system 104, the authentication system 106, and/or the risk score system 110 (e.g., the first confidence score, the second confidence score, and the third confidence score) may vary based on the variety of information available to the service provider system 104, the authentication system 106, and/or the risk score system 110. For example, the authentication system 106 may have access to less and/or different historical location and transactional information than the risk score system 110. Thus, the second confidence score generated by the risk score system 110 may be more accurate than the first confidence score generated by the authentication system 106. Furthermore, the risk score system 110 may consider the first confidence score when calculating the second confidence score. Similarly, the risk score system 110 may have access to less and/or different historical location and transactional information than the service provider system 104. Thus, the third confidence score generated by the service provider system 104 may be more accurate than the second confidence score generated by the risk score system 110. Furthermore, the service provider system 104 may consider the first confidence score and the second confidence score when calculating the third confidence score.

Figure 1F:
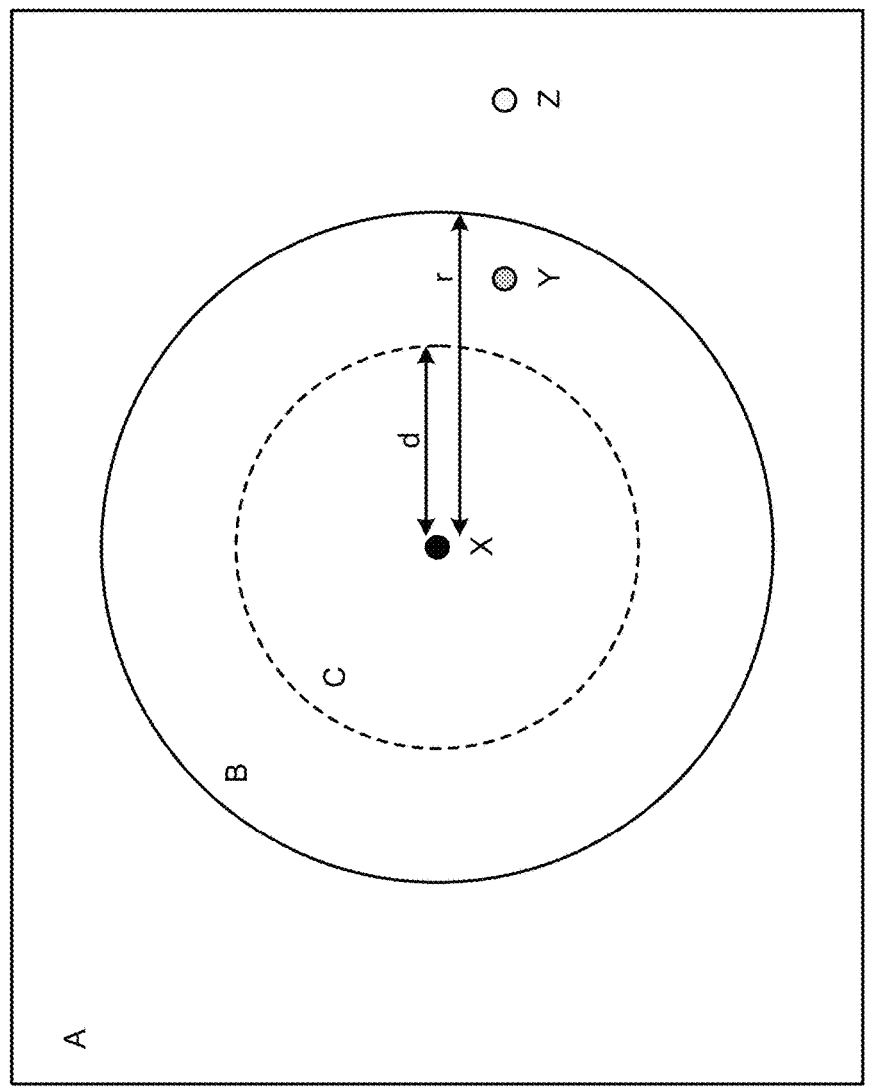

FIG. 1F depicts an example geofence analysis that may be performed by the service provider system 104, the authentication system 106, and/or the risk score system 110. To perform the geofence analysis based on the location of an ongoing transaction (e.g., of the user device 102), a system (e.g., the service provider system 104, the authentication system 106, and/or the risk score system 110) may determine an acceptable variability for the location based on historical locations of historical transactions associated with the user device 102. As shown in FIG. 1F, multiple geographic planes (geo-planes) (e.g., geo-plane A, geo-plane B, geo-plane C) may represent real geographic regions. Specific geographic locations (e.g., location X, location Y, and location Z) associated with the user device 102 may be provided within the geo-planes. For example, location X may be provided in geo-plane C, location Y may be provided in geo-plane B, and location Z may be provided in geo-plane A. Location X may be associated with a most recent transaction of the user device 102, and location Y or location Z may be associated with current transaction of the user device 102.

Based on historical transactional locations of the user device 102, the system may calculate a radius (d) of a geo-plane (e.g., geo-plane C) that represents a region in which to expect the location of the current transaction to be. For example, the radius (d) may define a region that includes locations in which the user typically conducts transactions (e.g., at home, at work, and/or the like), locations near the user's home location or work location, locations associated with the user's spending patterns, locations associated with the user's types of transactions, and/or the like. The system may consider this region to be a safe boundary with a high probability for the user to be associated with the transaction and with a high confidence score of being genuine.

Beyond geo-plane C, the system may also define a radius (r) of a geo-plane (e.g., geo-plane B) that represents a region in which to expect the location of the current transaction to be (e.g., to a lesser degree than geo-plane C). For example, the radius (r) may define a region that includes locations in which the user typically travels to and conducts transactions (e.g., at home, at work, and/or the like), locations within a driving distance of the user's home location or work location, locations associated with the user's spending patterns, locations associated with the user's types of transactions, and/or the like. The system may consider this region to be a less safe boundary than geo-plane C, with a lesser probability for the user to be associated with the transaction and with a medium confidence score of being genuine. However, the system may consider geo-plane B to provide an acceptable probability of the user being genuine. Assuming location Y is a transactional location for the current transaction, the system may not generate a high confidence score for location Y but may still deem the transaction to be within a plausible range and a satisfactory confidence score. The system may determine a time elapsed (T) between a current transaction and a most recent transaction, and may determine maximum travel speed (S) that the user can achieve between the two transactions. The system may calculate the radius (r) by multiplying the time elapsed (T) and the maximum travel speed (S) (e.g., $r \leq S \times T$). The system may perform a similar calculation for radius (d).

Finally, the system may determine any transactional location (e.g., location Z), occurring beyond the higher bound set by the system (e.g., within geo-plane A) to be fraudulent and may flag the transaction with a very low confidence score. In some implementations, the system may define geo-plane A, geo-plane B, and geo-plane C based on analyzing and clustering historical locations of historical transactions conducted by the user over the past many months/years, historical locations typically travelled to by the user, historical locations of historical transactions located close together, timing associated with the historical transactions, and/or the like.

In this way, the service provider system 104 mitigates fraud based on geofencing. For example, the service provider system 104 may incorporate mobile geofencing to further proof the service provider system 104 against fraud (e.g., security breaches, fraudulent transactions, and/or the like) and provide an additional layer of security. The service provider system 104 may identify fraud (e.g., malicious user access of a service provided by the service provider system 104) by determining a risk associated with a transaction (e.g., a request to access the service) based on user and user device 102 attributes. The service provider system 104 may determine whether to allow or reject the transaction based on the risk. The service provider system 104 may utilize geofencing to complement the risk assessment based on a dynamic attribute (e.g., a physical location of the user) in real-time, and to validate an authenticity of the transaction. Thus, the service provider system 104 may conserve computing resources, networking resources, and/or other resources that would otherwise have otherwise been consumed by exposing sensitive user data to security risks, handling security breaches associated with sensitive user data, recovering sensitive user data lost in security breaches, and/or the like.

As indicated above, FIGS. 1A-1F are provided as an example. Other examples may differ from what is described with regard to FIGS. 1A-1F. The number and arrangement of devices shown in FIGS. 1A-IF are provided as an example. In practice, there may be additional devices, fewer devices, different devices, or differently arranged devices than those shown in FIGS. 1A-1F. Furthermore, two or more devices shown in FIGS. 1A-IF may be implemented within a single device, or a single device shown in FIGS. 1A-IF may be implemented as multiple, distributed devices. Additionally, or alternatively, a set of devices (e.g., one or more devices)

shown in FIGS. 1A-1F may perform one or more functions described as being performed by another set of devices shown in FIGS. 1A-1F.

Figure 2:
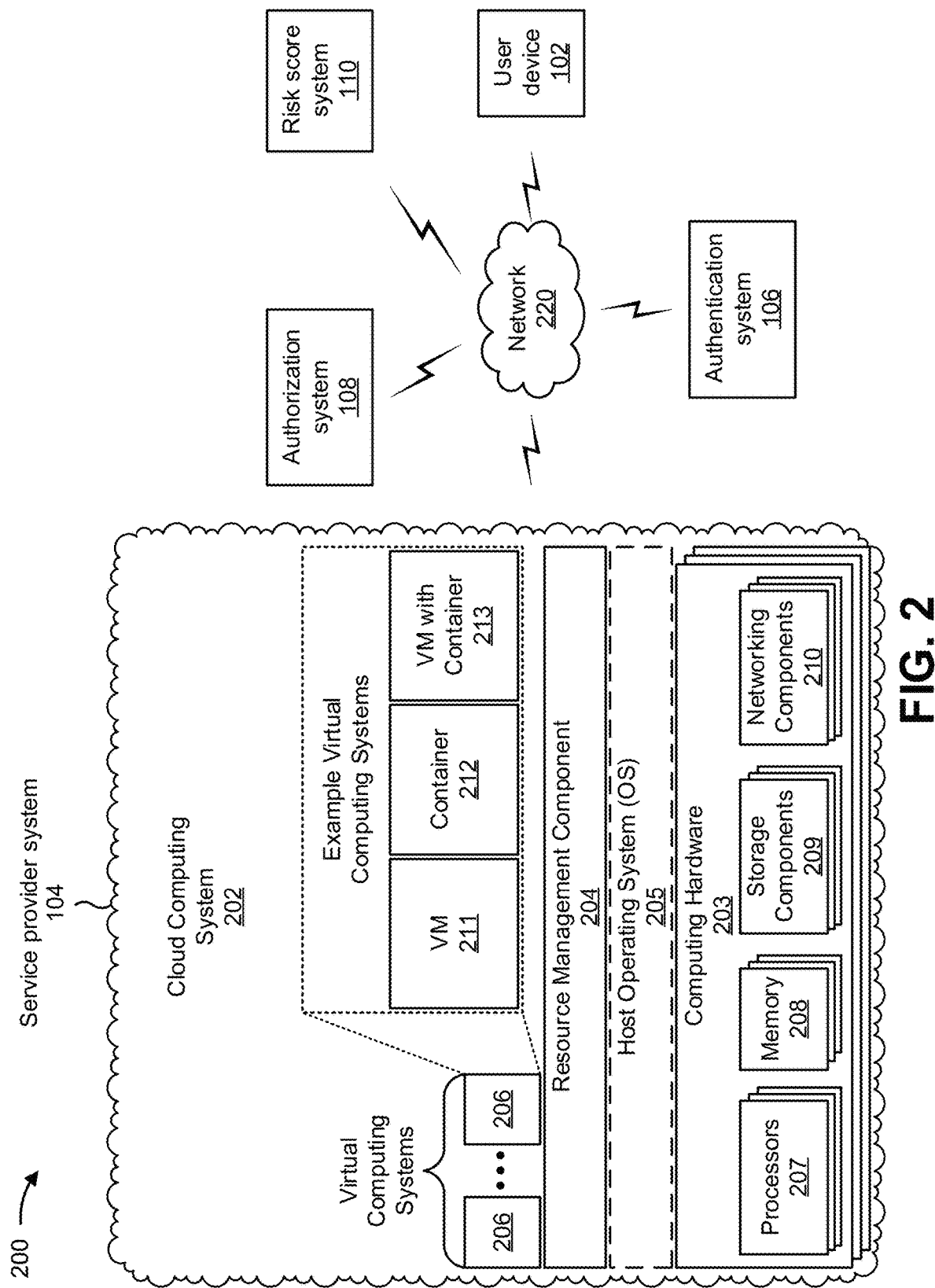
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the service provider system 104, which may include one or more elements of and/or may execute within a cloud computing system 202. The cloud computing system 202 may include one or more elements 203-213, as described in more detail below. As further shown in FIG. 2, environment 200 may include the user device 102, the authentication system 106, the authorization system 108, the risk score system 110, and/or a network 220. Devices and/or elements of environment 200 may interconnect via wired connections and/or wireless connections.

The user device 102 includes one or more devices capable of receiving, generating, storing, processing, and/or providing information, as described elsewhere herein. The user device 102 may include a communication device and/or a computing device. For example, the user device 102 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the service provider system 104 may include one or more elements 203-213 of the cloud computing system 202, may execute within the cloud computing system 202, and/or may be hosted within the cloud computing system 202, in some implementations, the service provider system 104 may not be cloud-based (e.g., may be implemented outside of a cloud computing system) or may be partially cloud-based. For example, the service provider system 104 may include one or more devices that are not part of the cloud computing system 202, such as the device 300 of FIG. 3, which may include a standalone server or another type of computing device. The service provider system 104 may perform one or more operations and/or processes described in more detail elsewhere herein.

The authentication system 106 includes one or more devices capable of receiving, generating, storing, processing, providing, and/or routing information, as described elsewhere herein. The authentication system 106 may include a communication device and/or a computing device. For example, the authentication system 106 may include a server, such as an application server, a client server, a web server, a database server, a host server, a proxy server, a virtual server (e.g., executing on computing hardware), or a server in a cloud computing system. In some implementations, the authentication system 106 includes computing hardware used in a cloud computing environment. In some implementations, the authentication system 106 may utilize a secure protocol (e.g., an OIDC protocol).

The authorization system 108 includes one or more devices capable of receiving, generating, storing, processing, providing, and/or routing information, as described elsewhere herein. The authorization system 108 may include a communication device and/or a computing device. For example, the authorization system 108 may include a server, such as an application server, a client server, a web server, a database server, a host server, a proxy server, a virtual server (e.g., executing on computing hardware), or a server in a cloud computing system. In some implementations, the authorization system 108 includes computing hardware used in a cloud computing environment. In some implementations, the authorization system 108 may utilize a secure protocol (e.g., an OIDC protocol).

The risk score system 110 includes one or more devices capable of receiving, generating, storing, processing, providing, and/or routing information, as described elsewhere herein. The risk score system 110 may include a communication device and/or a computing device. For example, the risk score system 110 may include a server, such as an application server, a client server, a web server, a database server, a host server, a proxy server, a virtual server (e.g., executing on computing hardware), or a server in a cloud computing system. In some implementations, the risk score system 110 includes computing hardware used in a cloud computing environment.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

FIG. 3 is a diagram of example components of a device 300, which may correspond to the user device 102, the service provider system 104, the authentication system 106, the authorization system 108, and/or the risk score system 110. In some implementations, the user device 102, the service provider system 104, the authentication system 106, the authorization system 108, and/or the risk score system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for mitigating fraud based on geofencing. In some implementations, one or more process blocks of FIG. 4 may be performed by a device (e.g., the service provider system 104). In some implementations, one or more process blocks of FIG. 4 may be performed by another device or a group of devices separate from or including the device, such as an authentication system (e.g., the authentication system 106), an authorization system (e.g., the authorization system 108), and/or a risk score system (e.g., the risk score system 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a user device associated with a user and located at a location, a request to access a service provided by the device (block 405). For example, the device may receive, from a user device associated with a user and located at a location, a request to access a service provided by the device, as described above.

As further shown in FIG. 4, process 400 may include providing, based on the request, an authorization request to an authentication system (block 410). For example, the device may provide, based on the request, an authorization request to an authentication system, as described above.

As further shown in FIG. 4, process 400 may include receiving, based on the authorization request, an authorization code from the authentication system (block 415). For example, the device may receive, based on the authorization request, an authorization code from the authentication system, as described above.

As further shown in FIG. 4, process 400 may include requesting, from an authorization system, an access token based on the authorization code (block 420). For example, the device may request, from an authorization system, an access token based on the authorization code, as described above.

As further shown in FIG. 4, process 400 may include receiving, from the authorization system, the access token based on requesting the access token (block 425). For example, the device may receive, from the authorization system, the access token based on requesting the access token, as described above.

As further shown in FIG. 4, process 400 may include requesting, from the authorization system, user information based on the access token (block 430). For example, the device may request, from the authorization system, user information based on the access token, as described above.

As further shown in FIG. 4, process 400 may include receiving from the authorization system, and based on requesting the user information, approved user information and a first confidence score and a second confidence score that are generated based on a geofence analysis of the location (block 435). For example, the device may receive from the authorization system, and based on requesting the user information, approved user information and a first confidence score and a second confidence score that are generated based on a geofence analysis of the location, as described above. In some implementations, the approved user information includes information identifying one or more of a name of the user, an email address associated with the user, or a telephone number associated with the user. In some implementations, the first confidence score is generated based on the geofence analysis of the location and a geofence analysis of historical locations of the user device. In some implementations, the first confidence score is generated based on whether the location is located within a first geo-plane region with a first region confidence score, a second geo-plane region with a second region confidence score that is less than the first region confidence score, or a third geo-plane region with a third region confidence score that is less than the second region confidence score.

In some implementations, the second confidence score is generated based on the first confidence score and based on whether the location is located within a first geo-plane region with a first region confidence score, a second geo-plane region with a second region confidence score that is less than the first region confidence score, or a third geo-plane region with a third region confidence score that is less than the second region confidence score.

As further shown in FIG. 4, process 400 may include performing a geofence analysis of the location to generate a third confidence score (block 440). For example, the device may perform a geofence analysis of the location to generate a third confidence score, as described above. In some implementations, performing the geofence analysis of the location to generate the third confidence score includes calculating a first geo-plane region based on a particular location of a most recent transaction of the user device; assigning a first region confidence score to the first geo-plane region; calculating a second geo-plane region, that includes and is larger than the first geo-plane region, based on the particular location of the most recent transaction of the user device; assigning a second region confidence score, that is less than the first region confidence score, to the second geo-plane region; calculating a third geo-plane region, that includes and is larger than the second geo-plane region, based on the particular location of the most recent transaction of the user device; assigning a third region confidence score, that is less than the second region confidence score, to the third geo-plane region; and generating the third confidence score based on whether the location is located within the first geo-plane region, the second geo-plane region, or the third geo-plane region.

In some implementations, calculating the first geo-plane region includes determining a time elapsed between the most recent transaction of the user device and receipt of the request from the user device, determining a maximum travel speed of the user device, calculating a distance from the particular location based on the time and the maximum travel speed, and calculating the first geo-plane region based on the distance.

In some implementations, calculating the second geo-plane region includes determining a time elapsed between the most recent transaction of the user device and receipt of the request from the user device, determining a maximum travel speed of the user device, calculating a distance from the particular location based on the time and the maximum travel speed, and calculating the second geo-plane region based on the distance.

As further shown in FIG. 4, process 400 may include determining whether the request is genuine or fraudulent based on the approved user information, the first confidence score, the second confidence score, and the third confidence score (block 445). For example, the device may determine whether the request is genuine or fraudulent based on the approved user information, the first confidence score, the second confidence score, and the third confidence score, as described above. In some implementations, determining whether the request is genuine or fraudulent includes assigning weights to the first confidence score, the second confidence score, and the third confidence score to generate a first weighted confidence score, a second weighted confidence score, and a third weighted confidence score, respectively; adding the first weighted confidence score, the second weighted confidence score, and the third weighted confidence score to generate a final confidence score; and determining whether the request is genuine or fraudulent based on the approved user information and the final confidence score.

In some implementations, determining whether the request is genuine or fraudulent includes adding the first confidence score, the second confidence score, and the third confidence score to generate a final confidence score, and determining whether the request is genuine or fraudulent based on the approved user information and the final confidence score.

As further shown in FIG. 4, process 400 may include approving or denying the request based on whether the request is genuine or fraudulent (block 450). For example, the device may approve or denying the request based on whether the request is genuine or fraudulent, as described above. In some implementations, approving or denying the request based on whether the request is genuine or fraudulent includes approving the request when the request is genuine, or denying the request when the request is fraudulent.

In some implementations, process 400 includes performing a risk analysis of the approved user information to generate a risk score, and determining whether the request is genuine or fraudulent includes determining whether the request is genuine or fraudulent based on the risk score, the approved user information, the first confidence score, the second confidence score, and the third confidence score.

In some implementations, process 400 includes providing, to the user device, an indication of whether the request is approved or denied based on whether the request is genuine or fraudulent.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device and from a user device associated with a user and located at a location, a request to access a service provided by the device;
    providing, by the device and based on the request, an authorization request to an authentication system;
    receiving, by the device and based on the authorization request, an authorization code from the authentication system;
    requesting, by the device and from an authorization system, an access token based on the authorization code;
    receiving, by the device and from the authorization system, the access token based on requesting the access token;
    requesting, by the device and from the authorization system, user information based on the access token;
    receiving, by the device, from the authorization system, and based on requesting the user information, approved user information, a first confidence score, and a second confidence score,
        wherein the first confidence score is generated based on:
            a first geofence analysis of the location and a geofence analysis of historical locations of the user device, and
            receiving an indication associated with consent, and
        wherein the second confidence score is generated based on the first confidence score and a second geofence analysis of the location;
    performing, by the device and based on the first confidence score and the second confidence score, a third geofence analysis of the location to generate a third confidence score;
    determining, by the device, whether the request is genuine or fraudulent based on the approved user information, the first confidence score, the second confidence score, and the third confidence score; and approving or denying, by the device, the request based on whether the request is genuine or fraudulent.

2. The method of claim 1, wherein the approved user information includes information identifying one or more of:
- a name of the user,
- an email address associated with the user, or
- a telephone number associated with the user.

3. The method of claim 1, wherein performing the third geofence analysis of the location to generate the third confidence score comprises:
- calculating a first geo-plane region based on a particular location of a most recent transaction of the user device;
- assigning a first region confidence score to the first geo-plane region;
- calculating a second geo-plane region, that includes and is larger than the first geo-plane region, based on the particular location of the most recent transaction of the user device;
- assigning a second region confidence score, that is less than the first region confidence score, to the second geo-plane region;
- calculating a third geo-plane region, that includes and is larger than the second geo-plane region, based on the particular location of the most recent transaction of the user device;
- assigning a third region confidence score, that is less than the second region confidence score, to the third geo-plane region; and
- generating the third confidence score based on whether the location is located within the first geo-plane region, the second geo-plane region, or the third geo-plane region.

4. The method of claim 3, wherein calculating the first geo-plane region comprises:
- determining a time elapsed between the most recent transaction of the user device and receipt of the request from the user device;
- determining a maximum travel speed of the user device;
- calculating a distance from the particular location based on the time and the maximum travel speed; and
- calculating the first geo-plane region based on the distance.

5. The method of claim 3, wherein calculating the second geo-plane region comprises:
- determining a time elapsed between the most recent transaction of the user device and receipt of the request from the user device;
- determining a maximum travel speed of the user device;
- calculating a distance from the particular location based on the time and the maximum travel speed; and
- calculating the second geo-plane region based on the distance.

6. The method of claim 1, wherein the first confidence score is generated based on whether the location is located within a first geo-plane region with a first region confidence score, a second geo-plane region with a second region confidence score that is less than the first region confidence score, or a third geo-plane region with a third region confidence score that is less than the second region confidence score.

7. A device, comprising:
one or more processors configured to:
- receive, from a user device associated with a user and located at a location, a request to access a service provided by the device;
- provide, based on the request, an authorization request to an authentication system;
- receive, based on the authorization request, an authorization code from the authentication system;
- request, from an authorization system, an access token based on the authorization code;
- receive, from the authorization system, the access token based on requesting the access token;
- request, from the authorization system, user information based on the access token;
- receive, from the authorization system and based on requesting the user information, approved user information, a first confidence score, and a second confidence score,
  wherein the first confidence score is generated based on:
  - a first geofence analysis of the location and a geofence analysis of historical locations of the user device, and
  - receiving an indication associated with consent, and
  wherein the second confidence score is generated based on the first confidence score and a second geofence analysis of the location;
- perform, based on the first confidence score and the second confidence score, a third geofence analysis of the location to generate a third confidence score;
- determine whether the request is genuine or fraudulent based on the approved user information, the first confidence score, the second confidence score, and the third confidence score; and
- approve or deny the request based on whether the request is genuine or fraudulent.

8. The device of claim 7, wherein the second confidence score is generated based on the first confidence score and based on whether the location is located within a first geo-plane region with a first region confidence score, a second geo-plane region with a second region confidence score that is less than the first region confidence score, or a third geo-plane region with a third region confidence score that is less than the second region confidence score.

9. The device of claim 7, wherein the one or more processors, to determine whether the request is genuine or fraudulent, are configured to:
- assign weights to the first confidence score, the second confidence score, and the third confidence score to generate a first weighted confidence score, a second weighted confidence score, and a third weighted confidence score, respectively;
- add the first weighted confidence score, the second weighted confidence score, and the third weighted confidence score to generate a final confidence score; and
- determine whether the request is genuine or fraudulent based on the approved user information and the final confidence score.

10. The device of claim 7, wherein the one or more processors, to determine whether the request is genuine or fraudulent, are configured to:
- add the first confidence score, the second confidence score, and the third confidence score to generate a final confidence score; and
- determine whether the request is genuine or fraudulent based on the approved user information and the final confidence score.

11. The device of claim 7, wherein the one or more processors are further configured to:

perform a risk analysis of the approved user information to generate a risk score,
wherein the one or more processors, to determine whether the request is genuine or fraudulent, are configured to:
determine whether the request is genuine or fraudulent based on the risk score, the approved user information, the first confidence score, the second confidence score, and the third confidence score.

12. The device of claim 7, wherein the one or more processors, to approve or deny the request based on whether the request is genuine or fraudulent, are configured to:
approve the request when the request is genuine; or
deny the request when the request is fraudulent.

13. The device of claim 7, wherein the one or more processors are further configured to:
provide, to the user device, an indication of whether the request is approved or denied based on whether the request is genuine or fraudulent.

14. The device of claim 7, wherein the one or more processors, to determine whether the request is genuine or fraudulent, are configured to:
determine whether a difference between the location and past locations associated with the user device can be travelled within a time period since a previous transaction associated with the user device.

15. The device of claim 7, wherein the one or more processors, to determine whether the request is genuine or fraudulent, are configured to:
determine whether the location is located within a subset of past locations associated with the user device.

16. A non-transitory computer-readable medium storing a set of instructions, the set of instructions comprising:
one or more instructions that, when executed by one or more processors of a device, cause the device to:
receive, from a user device associated with a user and located at a location, a request to access a service provided by the device;
provide, based on the request, an authorization request to an authentication system;
receive, based on the authorization request, an authorization code from the authentication system;
request, from an authorization system, an access token based on the authorization code;
receive, from the authorization system, the access token based on requesting the access token;
request, from the authorization system, user information based on the access token;
receive from the authorization system, and based on requesting the user information, approved user information and a first confidence score and a second confidence score,
wherein the first confidence score is generated based on:
a first geofence analysis of the location and a geofence analysis of historical locations of the user device, and
receiving an indication associated with consent, and
wherein the second confidence score is generated based on the first confidence score and a second geofence analysis of the location;
perform a third geofence analysis of the location to generate a third confidence score;
determine whether the request is genuine or fraudulent based on the approved user information, the first confidence score, the second confidence score, and the third confidence score;
approve or deny the request based on whether the request is genuine or fraudulent; and
provide, to the user device, an indication of whether the request is approved or denied based on whether the request is genuine or fraudulent.

17. The non-transitory computer-readable medium of claim 16, wherein the one or more instructions, that cause the device to perform the third geofence analysis of the location to generate the third confidence score, cause the device to:
calculate a first geo-plane region based on a particular location of a most recent transaction of the user device;
assign a first region confidence score to the first geo-plane region;
calculate a second geo-plane region, that includes and is larger than the first geo-plane region, based on the particular location of the most recent transaction of the user device;
assign a second region confidence score, that is less than the first region confidence score, to the second geo-plane region;
calculate a third geo-plane region, that includes and is larger than the second geo-plane region, based on the particular location of the most recent transaction of the user device;
assign a third region confidence score, that is less than the second region confidence score, to the third geo-plane region; and
generate the third confidence score based on whether the location is located within the first geo-plane region, the second geo-plane region, or the third geo-plane region.

18. The non-transitory computer-readable medium of claim 17, wherein the one or more instructions, that cause the device to calculate the first geo-plane region, cause the device to:
determine a time elapsed between the most recent transaction of the user device and receipt of the request from the user device;
determine a maximum travel speed of the user device;
calculate a distance from the particular location based on the time and the maximum travel speed; and
calculate the first geo-plane region based on the distance.

19. The non-transitory computer-readable medium of claim 17, wherein the one or more instructions, that cause the device to calculate the second geo-plane region, cause the device to:
determine a time elapsed between the most recent transaction of the user device and receipt of the request from the user device;
determine a maximum travel speed of the user device;
calculate a distance from the particular location based on the time and the maximum travel speed; and
calculate the second geo-plane region based on the distance.

20. The non-transitory computer-readable medium of claim 16, wherein the one or more instructions, that cause the device to determine whether the request is genuine or fraudulent, cause the device to:
assign weights to the first confidence score, the second confidence score, and the third confidence score to generate a first weighted confidence score, a second weighted confidence score, and a third weighted confidence score, respectively;
add the first weighted confidence score, the second weighted confidence score, and the third weighted confidence score to generate a final confidence score; and determine whether the request is genuine or fraudulent based on the approved user information and the final confidence score.

* * * * *